United States Patent
Weckhuysen et al.

(10) Patent No.: US 7,476,374 B2
(45) Date of Patent: Jan. 13, 2009

(54) CATALYTIC DESTRUCTION OF HALOGENATED HYDROCARBONS

(75) Inventors: Bert Weckhuysen, Houte (NL); Robert Schoonheydt, Tervuren (BE); Pieter Van Der Avert, Mortsel (BE)

(73) Assignee: K.U.Leuven Research & Development, Leuven (BE)

( * ) Notice: Subject to any disclaimer, the term of this patent is extended or adjusted under 35 U.S.C. 154(b) by 851 days.

(21) Appl. No.: 10/501,432

(22) PCT Filed: Jan. 14, 2003

(86) PCT No.: PCT/BE03/00005

§ 371 (c)(1),
(2), (4) Date: Jul. 13, 2004

(87) PCT Pub. No.: WO03/057318

PCT Pub. Date: Jul. 17, 2003

(65) Prior Publication Data

US 2005/0069478 A1    Mar. 31, 2005

(30) Foreign Application Priority Data

Jan. 14, 2002 (GB) ................... 0200754.0
Mar. 2, 2002 (GB) ................... 0204903.9
Dec. 16, 2002 (GB) ................... 0229145.8

(51) Int. Cl.
*B01D 53/50* (2006.01)
*B01D 53/56* (2006.01)
*B01D 53/68* (2006.01)
*B01D 53/70* (2006.01)
*B01J 23/00* (2006.01)
*B01J 23/10* (2006.01)

(52) U.S. Cl. ............... 423/240 R; 423/461; 502/302; 502/303; 502/304

(58) Field of Classification Search ............... 502/302, 502/303, 304; 423/461, 240 R
See application file for complete search history.

(56) References Cited

U.S. PATENT DOCUMENTS 5,716,590 A    2/1998    Roewer et al.

(Continued)

OTHER PUBLICATIONS

Sinquin et al. Perovskites as polyvalent catalysts for total destruction of C1, C2 and aromatic chlorinated volatile organic compounds. Catalysis Today 54 (1999) 107-118.*

(Continued)

*Primary Examiner*—Karl E Group
*Assistant Examiner*—Noah S Wiese
(74) *Attorney, Agent, or Firm*—Clark & Elbing LLP

(57) ABSTRACT

The destruction of chlorinated hydrocarbons, such as carbon tetrachloride, over lanthanide-based solid catalysts in the presence of steam has been investigated between 200 and 350° C. $Ln_2O_3/Al_2O_3$ (e.g. Ln=La, Nd, Ce and Pr) show a very high catalytic hydrolysis activity. The destruction capacity gradually increases with increasing temperature and reaches a maximum value of $42.3 \cdot 10^6$ ppm.h$^{-1}$ at 350° C. for a 10 wt % $Ln_2O_3/Al_2O_3$ catalyst This destruction capacity could be maintained for a least 48 hours. The catalyst activity is also function of the type of lanthanide oxide; i.e., La≈Nd>Ce≈Pr. The process is based on a delicate equilibrium between destructive adsorption of $CCl_4$ onto the lanthanide oxide and the dechlorination of the formed lanthanide chloride with steam. Steam being responsible for the in situ regeneration of the catalytic active phase.

12 Claims, 4 Drawing Sheets

U.S. PATENT DOCUMENTS

| | | | | |
|---|---|---|---|---|
| 6,023,007 | A | * | 2/2000 | Nakajo et al. ............... 588/316 |
| 6,069,291 | A | | 5/2000 | Rossin et al. |
| 6,162,957 | A | * | 12/2000 | Nakajo et al. ............... 423/219 |
| 2001/0038814 | A1 | | 11/2001 | Fischer et al. |

OTHER PUBLICATIONS

Shi et al. NO reduction by CH3 in the presence of O2 over La2O3 supported on Al2O3. Applied Catalysis B: Environmental 14 (1997) 175-188.*

Bonarowska et al., "Hydrodechlorination of $CCl_2F_2$ (CFC-12) over silica-supported palladium-gold catalysts," *Appl. Catal. B—Environ.* 30: 187-193 (2001).

Bond and Sadeghi, "Catalysed destruction of chlorinated hydrocarbons," *J. Appl. Chem. Biotechnol.* 25: 241-248 (1975).

Chatterjee et al., "Comparison of modified transition metal-exchanged zeolite catalysts for oxidation of chlorinated hydrocarbons," *J. Catal.* 138: 179-194 (1992).

Corella et al., "On the selection of the catalyst among the commercial platinum-based ones for total oxidation of some chlorinated hydrocarbons," *Appl. Catal. B—Environ.* 27: 243-256 (2000).

Elia et al., "$NO_x$-catalyzed deep oxidation of toxic chloroorganics by dioxygen: possible application in environmental remediation," *Catal. Lett.* 68: 153-156 (2000).

Feijen-Jeurissen et al., "Mechanism of catalytic destruction of 1,2-dichloroethane and trichloroethylene over $\gamma Al_2O_3$ and $\gamma$-$Al_2O_3$ supported chromium and palladium catalysts," *Catal. Today* 54: 65-79 (1999).

Frankel et al., "Deactivation of hydrodechlorination catalysts: I. Experiments with 1,1,1-trichloroethane," *Appl. Catal. A—Gen.* 205: 263-278 (2001).

González-Velasco et al., "Enhancement of the catalytic oxidation of hydrogen-lean chlorinated VOCs in the presence of hydrogen-supplying compounds," *Appl. Catal. B—Environ.* 24: 33-43 (2000).

González-Velasco et al., "Evaluation of H-type zeolites in the destructive oxidation of chlorinated volatile organic compounds," *Appl. Catal. B—Environ.* 24: 233-242 (2000).

Hileman, "Concerns broaden over chlorine and chlorinated hydrocarbons: calls for gradual phaseout of classes of chlorinated organics are being made in response to evidence of adverse health effects on humans and wildlife," *C&EN* 71: 11-20 (1993).

Juszczyk et al., "Hydrodechlorination of $CCl_2F_2$ (CFC-12) over $\gamma$-alumina supported palladium catalysts," *Appl. Catal. A—Gen.* 166: 311-319 (1998).

Kim et al., "Role of water in the catalytic decomposition of chlorinated hydrocarbons over chromium-containing catalysts," *J. Chem. Eng. Japan* 34: 143-147 (2001).

Krishnamoorthy et al., "Catalytic oxidation of 1,2-dichlorobenzene over supported transition metal oxides," *J. Catal.* 193: 264-272 (2000).

Lester, "Catalytic destruction of hazardous halogenated organic chemicals," *Catal. Today* 53: 407-418 (1999).

Liu et al., "Catalytic oxidation of chlorobenzene on supported manganese oxide catalysts," *Appl. Catal. B—Environ.* 29: 61-67 (2001).

Lou and Lee, "Destruction of trichloromethane with catalytic oxidation," *Appl. Catal. B—Environ.* 12: 111-123 (1997).

Padilla et al., "Total oxidation of some chlorinated hydrocarbons with commercial chromia based catalysts," *Appl. Catal. B—Environ.* 22: 107-121 (1999).

Petrosius et al., "Low-temperature decomposition of some halogenated hydrocarbons using metal oxide/porous carbon catalysts," *J. Am. Chem. Soc.* 115: 6131-6137 (1993).

Pistarino et al., "A study of the catalytic dehydrochlorination of 2-chloropropane in oxidizing conditions," *Ind. Eng. Chem. Res.* 39: 2752-2760 (2000).

Poplawski et al., "Catalytic oxidation of 1,2-dichlorobenzene over $ABO_3$-type perovskites," *Catal. Today* 62: 329-336 (2000).

Schneider et al., "Cordierite monolith supported pervoskite-type oxides—catalysts for the total oxidation of chlorinated hydrocarbons," *Appl. Catal. B—Environ.* 28: 187-195 (2000).

Shin et al., "Gas phase catalytic hydrodechlorination of chlorophenols using a supported nickel catalyst," *Appl. Catal. B—Environ.* 18: 241-250 (1998).

Sinquin et al., "Catalytic destruction of chlorinated $C_1$ volatile organic compounds (CVOCs) reactivity, oxidation and hydrolysis mechanisms," *Appl. Catal. B—Environ.* 27: 105-115 (2000).

Sinquin et al., "Perovskites as polyvalent catalysts for total destruction of $C_1$ $C_2$ and aromatic chlorinated volatile organic compounds," *Catal. Today* 54: 107-118 (1999).

Spivey, "Complete catalytic oxidation of volatile organics," *Ind. Eng. Chem. Res.* 26: 2165-2180 (1987).

van den Brink and Louw, "Catalytic combustion of chlorobenzene on $Pt/_\gamma$ -$Al_2O_3$ in the presence of aliphatic hydrocarbons," *Catal. Today* 54: 101-106 (1999).

Yim et al., "Catalytic removal of perchloroethylene (PCE) over supported chromium oxide catalysts," *Catal. Today* 63: 215-222 (2000).

Zhang et al., "Genesis of durable catalyst for selective hydrodechlorination of $CCl_4$ to $CHCl_3$," *Appl. Catal. A—Gen.* 174: 33-39 (1998).

Database WPI, Section Ch, Week 198614, Derwent Publications Ltd., XP0002242607 (1986).

Database WPI, Section Ch, Week 200036, Derwent Publications Ltd., XP002242608 (2000).

* cited by examiner

CATALYTIC DESTRUCTION OF HALOGENATED HYDROCARBONS

CROSS REFERENCE TO RELATED APPLICATIONS

This application is the U.S. National Stage of International Application No. PCT/BE03/00005, filed Jan. 14, 2003, which was published in English under PCT Article 21(2), and which claims the benefit of GB 0200754.0, filed Jan. 14, 2002, GB 0204903.9 filed Mar. 2, 2002, and GB 0229145.8, filed Dec. 16, 2002 respectively. The disclosures of each of these aforementioned applications are hereby incorporated by reference.

FIELD OF INVENTION

The present invention relates to catalytic methods and compositions for hydrolytic destruction of halogenated hydrocarbons. In addition the invention provides methods to control the reaction products obtained in the catalytic process, this control allowing the conversion of halogenated hydrocarbons towards valuable chemicals.

BACKGROUND OF THE INVENTION

Although they are proven to be highly toxic and carcinogenic, chlorinated hydrocarbons (CHC's) are still widely used in the manufacturing of many chemical compounds, such as herbicides, fungicides and pharmaceuticals [1]. CHC's are also applied in dry cleaning processes, in degreasing operations and as organic solvents [2]. As a consequence, CHC's are found in the flue gases of many industrial installations. In the present context industry is defined broadly, it encompasses combustion processes, from power plants to municipal waste incineration, and also processes where volatile chlorinated hydrocarbons are made (both deliberately and as by-products), or where they are used. The compounds that are important for this activity and are thought to have important fluxes from industry are: carbon tetrachloride ($CCl_4$), methyl chloride ($CH_3Cl$), dichloromethane ($CH_2Cl_2$ or methylene chloride), trichloromethane ($CHCl_3$ or chloroform), trichloroethene ($CCl_2=CHCl$ or trichloroethylene) and tetrachloroethene ($CCl_2=CCl_2$ or perchloroethylene), chlorobenzene, chlorotoluene as well as derivatives thereof.

The current method to remove CHC's is thermal incineration at temperatures higher than 1300° C. These high temperatures are required to avoid the formation of dioxins and polychlorobiphenyls (PCB's) [3]. Because of the high incineration temperatures and consequently, the high costs, scientists are forced to look for other but cheaper alternatives that are not harmful to the environment [4].

A first alternative process is the catalytic oxidation of CHC's at temperatures between 300° C. and 550° C. over supported noble metal catalysts (e.g. Pt, Pd and Au) [5-9]. The essential drawback here is the deactivation of the catalyst by the decomposition products including $Cl_2$ and HCl [10]. Another disadvantage is the formation of volatile oxychlorides, which can condense and block the installation in the colder parts of the reactor. The formation of these by-products can (partially) be solved by adding small amounts of steam to the CHC's feed. In contrast, it has been stated that supported transition metal oxide catalysts are resistant to these kinds of deactivation [11]. Among these types of oxides $Cr_2O_3$ seems to be the most promising catalyst for the total oxidation of CHC's [12-15]. Frequently used supports are $Al_2O_3$, $TiO_2$ and $SiO_2$[16]. Other classes of materials are zeolites (e.g. H—Y and H-ZSM-5 zeolites), perovskites (e.g. $LaCoO_3$ and $LaMnO_3$) and pillared clays [17-21].

A second alternative for incineration is hydrodechlorination in which a CHC is transformed in the presence of hydrogen into the corresponding alkane and HCl [22,23]. Commonly used catalysts are Pd and Pt on various supports [24, 25]. $Ni/SiO_2$ catalysts also seem to possess a high activity [26]. Although this technique has economic and environmental advantages, Including the re-use of the reaction products and the elimination of hazardous by-products (e.g. $Cl_2$ and $COCl_2$), it is not used very often. The main reason is the very fast deactivation of the catalyst material. This deactivation is probably due to the interaction between HCl and the catalyst and to coke formation caused by oligomers formed on the acid sites of the catalyst.

A third alternative for incineration was provided by Weckhuysen e.a. (J. Phys. Chem B, 1998, 102, 3773-3778). They have studied the destructive adsorption of carbon tetrachloride on alkaline earth metal oxides, more specifically BaO, SrO, CaO and MgO. They concluded that alkaline earth metal oxides are active materials for the destructive adsorption of carbon tetrachloride in the absence of $O_2$. The destruction activity parallels the basicity of the alkaline earth metal oxide; i.e., the activity towards $CCl_4$ decreases in the order: BaO>SrO>CaO>MgO. Carbon tetrachloride destruction was accompanied by the formation of chlorides ($BaCl_2$; SrCl2, $CaCl_2$ and $MgCl_2$ in the case of BaO, SrO, CaO and MgO, respectively). They observed that the resulting barium chloride is recyclable by dissolving the solid in water, followed by precipitation and heating in oxygen. The biggest disadvantage of this technique however is that it is a stoechiometric and not a catalytic process. This means that, once the metal oxide is converted to the corresponding chloride, the activity of the system falls back to almost undetectable destruction levels.

The U.S. Pat. No. 4,561,969 provides a process for the removal of the halogen moiety from halogenated hydrocarbon feedstock. The homogenous process described in this patent depends on the use of sulfuric acid and a lanthanide oxide, the latter being required to break the chlorine ion from the hydrocarbon in order to form a chlorosulfonic acid. The oxides are regenerated by bubbling $O_2$ through the depleted $H_2SO_4$ solution.

The present invention provides a solution to the aforesaid problems by offering methods and catalytic compositions for hydrolytic destruction of halogenated hydrocarbons in a heterogeneous process. In addition the invention provides methods to control the reaction products obtained in the catalytic process, this control allowing the conversion of chlorinated hydrocarbons towards valuable chemicals.

SUMMARY OF THE INVENTION

The present invention is related to compositions and methods useful for treating gas streams containing halogenated hydrocarbons.

One embodiment of this invention relates to a method for hydrolytic destruction of halogenated hydrocarbons, comprising the steps of: (a) providing a gas stream comprising halogenated hydrocarbons; and (b) contacting the gas stream with an effective amount of a composition comprising a lanthanide oxide or a mixture of lanthanide oxides. In this embodiment the destruction of the halogenated hydrocarbons is accompanied by the formation of halogenated metal oxides.

In another embodiment this invention relates to a method for the catalytic hydrolytic destruction of halogenated hydrocarbons, comprising the steps of: (a) providing a gas stream comprising halogenated hydrocarbons; and (b) contacting the gas stream with an effective amount of a composition comprising a lanthanide oxide or a mixture of lanthanide oxides in the presence of steam.

In another embodiment this invention relates to a method for the catalytic hydrolytic destruction of halogenated hydrocarbons, comprising the steps of: (a) providing a gas stream comprising halogenated hydrocarbons; and (b) contacting the gas stream with an effective amount of a composition comprising a lanthanide oxide or a mixture of lanthanide oxides in the presence of steam. Said lanthanide oxide or mixture of lanthanide oxides being supported on alumina, ceria, titania, silica, silica-alumina, manganese oxide, zirconia, zeolites or mixtures or composites thereof. Nevertheless, it was demonstrated that the highest destruction conversions were obtained when the lanthanide oxide was supported on alumina. Therefore, in a more preferred embodiment a composition comprising a lanthanide oxide or mixture of lanthanide oxides, which is supported by alumina, is used for the catalytic destruction of halogenated hydrocarbons according to the present invention.

A further embodiment relates to a catalyst for hydrolytic destruction of gaseous halogenated hydrocarbons comprising a lanthanide oxide or a mixture of lanthanide oxides as an active phase. In a more preferred embodiment said lanthanide oxide or mixture of lanthanide oxides is supported on alumina, ceria, titania, silica, silica-alumina, manganese oxide, zirconia, zeolites or mixtures or composites thereof. In an even more preferred embodiment said lanthanide oxide or mixture of lanthanide oxides is supported on alumina. In another preferred embodiment the amount of the lanthanide oxide or mixture of lanthanide oxides of a steam regenerated catalytic preparation exceeds 5% of the total weight of the dry weight of said catalytic preparation.

Different parameters modulate the destruction capacity of the method of the present invention. In first instance, it was demonstrated that the destruction capacity gradually increases with increasing temperature between 200 and 350° C. for a 10 wt % $La_2O_3/Al_2O_3$ catalyst. In second instance it was demonstrated that the catalyst activity can be controlled by the type of lanthanide oxide; i.e., the catalytic function of La≈Nd>Ce≈Pr. In third instance it was shown that the catalytic destruction activity differed between supported or unsupported catalysts. Therefore, a person skilled in the art will understand that the manipulation of said parameters amongst others would lead to different reaction products of the catalytic hydrolysis process. More particularly, the parameters can be set in order to obtain reaction products that can be used as precursors of valuable chemicals. In a preferred embodiment the parameters were set in order to realise an incomplete destruction of $CH_2Cl_2$ and $CHCl_3$ and the selective formation of methyl chloride ($CH_3Cl$). Methyl chloride is employed in the preparation of methanol, dimethyl ether, light olefins, such ethylene, propylene and butenes and higher hydrocarbons, including gasolines. This embodiment of the invention can be beneficially employed in industrial processes using significant amounts $CH_2Cl_2$, such as the production of cleaning solvents and paint removers or in processes using significant amounts of $CHCl_3$, such as stain removers, teflon and Chlorofluorocarbons.

A person skilled in the art understands that the catalytic destruction of halogenated hydrocarbons using the catalytic composition of the present invention is based on a chemical equilibrium. The reaction with the halogenated hydrocarbons generates lanthanide oxide halogens and eventually lanthanide halogens, while on the other hand steam acts on the lanthanide oxide halogens and lanthanide halogens to regenerate the lanthanide oxides in the catalytic composition. Given this equilibrium, it is clear that the catalytic composition of the present invention can be prepared using lanthanide oxides, lanthanide oxide halogens or lanthanide halogens or using mixtures thereof.

DETAILED DESCRIPTION OF THE INVENTION

Figure 1:
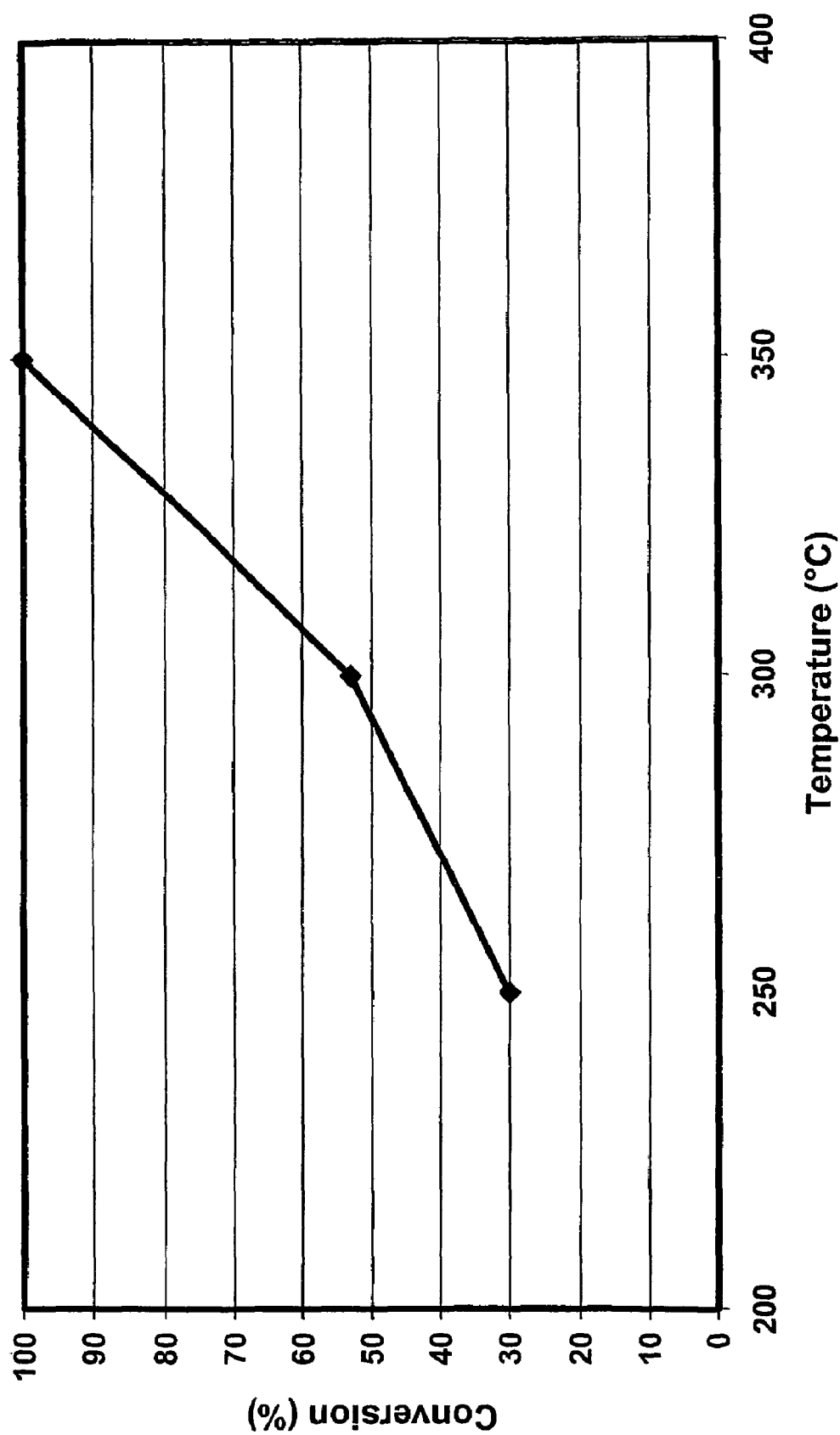
FIG. 1: Conversion of carbon tetrachloride over a 10 wt % $La_2O_3/Al_2O_3$ catalyst as a function of the reaction temperature.

The present invention is based on the finding that rare earth metal oxides, such as $La_2O_3$ and $CeO_2$, allow the destructive adsorption of halogenated hydrocarbons, such as carbon tetrachloride, in the absence of oxygen (Weckhuysen e.a., Physical Chemistry Chemical Physics, 1999, 1(13): 3157-3162). This destruction of the halogenated hydrocarbons was accompanied by the formation of metal oxide chlorides and as such it was a stoichiometric process, as was previously observed for the alkaline earth metal oxides. However, surprisingly it was possible to create an efficient catalytic system by adding steam to the reactor. The presence of the steam allows converting the formed metal oxide chlorides again into metal oxides in one single process.

A first aspect of present invention is a process for the catalytic destruction of halogenated hydrocarbons, comprising the steps of: (a) providing a gas stream comprising halogenated hydrocarbons; and (b) contacting the gas stream with an effective amount of a composition comprising a lanthanide oxide or a mixture of lanthanide oxides. Preferably this process is carried out under conditions allowing the regeneration of the lanthanide oxides following their reaction with the halogenated hydrocarbons, which can be achieved by the presence of steam in said gas stream. In a preferred embodiment the composition comprising a lanthanide oxide or a mixture of lanthanide oxides, is a solid catalyst supported by a suitable substrate and more preferably the substrate is a high surface alumina. The term high surface area is meant to describe surface areas comprising at least 80 $m^2/g$, typically from 80 to 300 $m^2/g$. In yet another preferred embodiment said composition comprises a lanthanide oxide or a mixture of lanthanide oxides having the general formula $Ln_2O_3$. The lanthanide (Ln) in this general formula being selected out of the group of Lanthanum, Cerium, Praseodymium, Neodymium, Promethium, Samarium, Europium, Gadolinium, Terbium, Dysprosium, Holmium, Erbium, Thulium, Ytterbium and Lutetium and more preferably the lanthanide oxide catalyst is selected from the group of compounds consisting of $La_2O_3$, $Nd_2O_3$, $Pr_2O_3$ and $Ce_2O_3$.

Preferably the halogenated hydrocarbons which are destructed by the process of present invention are fluorine hydrocarbons and most preferably chlorine hydrocarbons.

A second aspect of present invention is a catalytic process of converting chlorinated hydrocarbons in a flue gas into the reaction products $CO_2$ and HCl comprising flowing said halogenated hydrocarbons over a lanthanide oxide catalyst further comprising measuring the concentration of chlorinated hydrocabons in said flue gas from reaction site and accordingly adjusting the gas flow, temperature and steam supply at the reaction site to monitor the catalytic performance. This process may further comprise measuring unwanted reaction products, such as dioxins and/or polychlorobiphenyls, in said flue gases from reaction site and adjusting the reaction temperature accordingly to monitor the formation of unwanted reaction products of the destruction of said chlorinated or fluorinated hydrocarbons. In a preferred embodiment this dechlorination process comprises the use of lanthanide oxide catalysts of the group $La_2O_3/Al_2O_3$, $Pr_2O_3/Al_2O_3$, $Nd_2O_3/Al_2O_3$ and $Ce_2O_3/Al_2O_3$ and the destruction of chlorinated hydrocarbons occurs under steam and at a temperature below 350° C. or at a temperature of about 350° C. Most preferably the supported lanthanide oxide catalysts is a $La_2O_3/Al_2O_3$ catalyst and preferably the amount of $La_2O_3$ is at least 5 wt % of the total dry weight of the catalyst composition, for example 10 wt %.

A third aspects of the present invention relates to the use of said process for the destruction of halogenated hydrocarbons in order to obtain reaction products that can be used as precursors of valuable chemicals. Indeed, different parameters modulate the destruction capacity of the method of the present invention. In first instance, it was demonstrated that the destruction capacity gradually increases with increasing temperature between 200 and 350° C. for a 10 wt % $La_2O_3/Al_2O_3$ catalyst. In second instance it was demonstrated that the catalyst activity can be controlled by the type of lanthanide oxide; i.e., the catalytic function of La≈Nd>Ce≈Pr. In third instance, it was shown that the catalytic destruction activity differed between supported or unsupported catalysts. So the manipulation of said parameters, amongst others, leads to different reaction products of the catalytic hydrolysis process. More particularly, the parameters can be set in order to obtain reaction products that can be used as precursors of valuable chemicals. In a preferred embodiment the parameters were set in order to realise an incomplete destruction of $CH_2Cl_2$ and $CHCl_3$ and the selective formation of methyl chloride ($CH_3Cl$). Methyl chloride is employed in the preparation of methanol, dimethyl ether, light olefins, such ethylene, propylene and butenes and higher hydrocarbons, including gasolines. This embodiment of the invention can be beneficially employed in industrial processes using significant amounts $CH_2Cl_2$, such as the production of cleaning solvents and paint removers or in processes generating significant amounts of $CHCl_3$, such as stain removers, teflon and Chlorofluorocarbons.

A fourth aspect of the present is a process for the stripping of halogenated hydrocarbons dissolved or suspended in water or other solvents. Said solvents can either be organic or inorganic. A typical example is the stripping of the waste waters of a production plant using or producing halogenated hydrocarbons. In a preferred embodiment this stripping process uses the catalytic, hydrolitic destruction of halogenated and comprises the following steps (a) chasing the halogenated hydrocarbons out of the liquid phase, for example by heating the liquid phase or by flushing the liquid phase with a suitable gas, (b) contacting the gas stream containing said chased halogenated hydrocarbons with an effective amount of said catalytic lanthanide oxide-comprising composition, preferably in the presence of steam.

The preparation of the support materials for the catalysts of this invention may be prepared by means well known to those of ordinary skill in the art and include physical mixtures, coagulation, co-precipitation or impregnation. The techniques for preparing the materials by coagulation and co-precipitation may be found, for example, in U.S. Pat. No. 4,085,193. Typically support materials prepared by the methods described are in the form of a fine powder. The support material can be used in powdered form. Alternatively, the support material in powdered form can be subsequently formed into larger particles and particulate shapes. The catalytic material may be applied to the support material prior to forming the support material into a particulate shape, or alternatively after the support is shaped into particulate form. The support material may be shaped into particulate or pellet form, such as extrudates, spheres and tablets, using methods well known in the art. For example, catalyzed support powder can be combined with a binder such as a clay and rolled in a disk pelletizing apparatus to give catalyst spheres. The amount of binder can vary considerably but for convenience is present from about 10 to about 30 weight percent.

The catalytic material can be dispersed onto the support materials by means well known in the art. A preferred method is impregnation, wherein the support material in particulate or powder form is impregnated with a solution containing a soluble compound of the catalytic metal or metals. The solution may be an aqueous solution, one using an organic solvent, or a mixture of the two. An aqueous solution is preferred. The soluble compounds of the metal ion(s) should transform to the metal oxides upon heating in air at elevated temperatures and/or in the presence of steam.

The catalyst of the invention may be used in any configuration, shape or size, which exposes it to the gas to be treated. For example, the supported catalyst can be conveniently employed in particulate form or the supported catalyst can be deposited as a coating onto a solid monolithic substrate. In some applications when the particulate form is used it is desirable to provide a screen-like barrier that permits the flow of the gas stream but inhibits the movement of the solid particulates from one catalyst bed to the other.

In circumstances in which less mass is desirable or in which movement or agitation of particles of catalyst may result in attrition, dusting and resulting loss of dispersed metals, or undue increase in pressure drop across the particles due to high gas flows, a monolithic substrate is preferred. In the employment of a monolithic substrate, it is usually most convenient to employ the supported catalyst as a thin film or coating deposited on the inert substrate material which thereby provides the structural support for the catalyst. The inert substrate material can be any refractory material such as ceramic or metallic materials. It is desirable that the substrate material be unreactive with the catalyst and not be degraded by the gas to which it is exposed. For the treatment of gases containing halogenated organics, ceramic materials are preferred.

The monolithic substrate can best be utilized in any rigid unitary configuration, which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453. In a preferred embodiment, the honeycomb substrate has about 50 to about 600 cells per square inch of cross-sectional area. In an especially preferred embodiment, the honeycomb has about 100 to about 400 cells per square inch.

If a monolithic form is desired, each layer of catalyst of this invention can be deposited sequentially onto the monolithic honeycomb carrier by conventional means. For example, a slurry can be prepared by means known in the art such as combining the appropriate amounts of the supported catalyst of this invention in powder form, with water. The resultant slurry is typically ball-milled for about 8 to 18 hours to form a usable slurry. Other types of mills such as impact mills can be used to reduce the milling time to about 1-4 hours. The slurry is then applied as a thin film or coating onto the monolithic carrier by means well known in the art. Optionally, an adhesion aid such as alumina, silica, zirconium silicate, aluminum silicates or zirconium acetate can be added in the form of an aqueous slurry or solution. A common method involves dipping the monolithic carrier into said slurry, blowing out the excess slurry, drying and calcining in air at a temperature of about 450° C. to about 600° C. for about 1 to about 4 hours. This procedure can be repeated until the desired amount of catalyst of this invention is deposited on said monolithic honeycomb substrate.

An alternative method of preparation is to disperse the catalytic metal or metals and such other optional components on a monolithic substrate carrier which previously has been coated with only uncatalyzed support material by the above procedure. The compounds of catalytic metal, which can be used and the methods of dispersion are the same as described above. After one or more of these compounds have been dispersed onto the support material coated substrate, the coated substrate is dried and calcined at a temperature of about 400° C. to about 600° C. for a time of about 1 to 6 hours. If other components are desired, they may be impregnated simultaneously or individually in any order.

The present invention is based on the discovery that lanthanide-based solid catalysts have a high catalytic hydrolysis activity in the destruction of halogenated hydrocarbons such as carbon tetrachloride, in the presence of steam and in a proper temperature range of 200 and 350° C. The following is a demonstration of these findings by illustrative embodiments. The terminology used herein is for the purpose of describing particular embodiments only, and is not intended to limit the scope of the present invention.

EXAMPLE 1

Preparation of the Solid Catalyst Composition

The solid catalysts were prepared via the incipient wetness impregnation technique with aqueous solutions of the lanthanide compounds in their acetate form (Aldrich, >99.9%). $Al_2O_3$ (Condea) with a specific surface of 220 m$^2$/g, was used as support and contacted with the appropriate amount of impregnation solution. The impregnated samples were dried in a furnace at 100° C. for one hour. This operation was repeated until the desired lanthanide oxide loading was obtained. The catalysts were granulated and the fraction of 0.25-0.50 mm was used for catalytic experiments.

EXAMPLE 2

Testing of the Catalytic Composition in a Catalytic Process

Catalytic tests were performed in a fixed-bed reactor at atmospheric pressure. The reactor consists of a quartz tube loaded with 1 g of catalyst. The catalyst was first heated in the reactor tube overnight in an oxygen flow of 10 ml·min$^{-1}$ at 45° C. and then subjected at 250° C., 300° C. or 350° C. to a stream of He loaded with $CCl_4$ (VEL, p.a.). The $CCl_4$ loading in the He stream could be controlled by adjusting the temperature of the $CCl_4$ saturator. The total He flow was set at 8 ml·min$^{-1}$ resulting in a maximum $CCl_4$ loading of 47000 ppm (v/v). The space velocity (GHSV) was maintained at 800 h$^{-1}$. The gas flows were measured and controlled by mass flow controllers. Water was added to the reactor at a rate of 0.02 ml·min$^{-1}$ via a dosimeter and evaporated when in contact with the reactor walls and bed. The condensate was trapped in an impinger at room temperature at the end of the reactor tube. The remaining gases were guided to a gas chromatograph (HP 4890D with FID detector and methanator) equipped with a packed Hayesep Q CP column (80-100 mesh, 3 m length). The condensate was regularly analysed using a gas chromatograph of Perkin-Elmer Autosys equipped with a FID-detector and a CP-Sil 5CB column (inner diameter, 0.32 mm; film thickness, 0.25 µm; length, 40 m).

EXAMPLE 3

Preparation and Constituents of the Catalyst Composition

Experiments regarding the formulation and mode of preparation of the catalyst composition lead to the following observations:

1) Preferably aqueous solutions of the compounds in their acetate form are used. Catalyst compositions that were impregnated with the precursors in the nitrate form, obtained a 20% lower $CCl_4$ conversion than catalysts impregnated with acetate solutions.
2) $Al_2O_3$ is a preferred support, experiments performed with other supports than $Al_2O_3$ (such as $SiO_2$ and $TiO_2$) revealed systematically lower destruction conversions.

EXAMPLE 4

Destruction Activity of $La_2O_3/Al_2O_3$, Catalysts for $CCl_4$

FIG. 1 shows the destruction activity of a 10 wt % $La_2O_3/Al_2O_3$ catalyst as a function of the reaction temperature for a $CCl_4$ loading of 47000 ppm (v/v) in the presence of steam. The catalytic conversions were measured after 6 hours time-on-stream. It is clear that the conversion is around 0% at 200° C. but gradually increases with increasing reaction temperature up to a value of 100% at 350° C. The $Al_2O_3$ support material possess at these temperatures a short term activity of 45%, while the catalytic activity of $La_2O_3$ is around 60%. No other products than HCl and $CO_2$ were found in the effluent gas and in the collected condensate. This indicates the total hydrolysis of $CCl_4$ with steam to HCl and $CO_2$.

EXAMPLE 5

Comparison of $La_3O_3/Al_2O_3$ Catalysts for $CCl_4$ with Other Catalytic Systems Table I compares the destruction capacities of the 10 wt % $La_2O_3/Al_2O_3$ catalyst with other catalytic systems in the open and patent literature operating in the same temperature range (0-350° C.). It is clear that the 10 wt % $La_2O_3/Al_2O_3$ catalyst is three times more active than the best performing catalyst, namely Pt, Pd or Rh/$TiO_2$ catalysts, (Allied-Signal, Morristown, N.J.) reported up to now in the open and patent literature. In another series of experiments we have studied the stability of the 10 wt % $La_2O_3/Al_2O_3$ catalyst and observed that the total conversion of $CCl_4$ could be maintained for at least 48 hours.

EXAMPLE 6

Comparison of Different of Lanthanide Oxide-Based Catalysts

Figure 2:
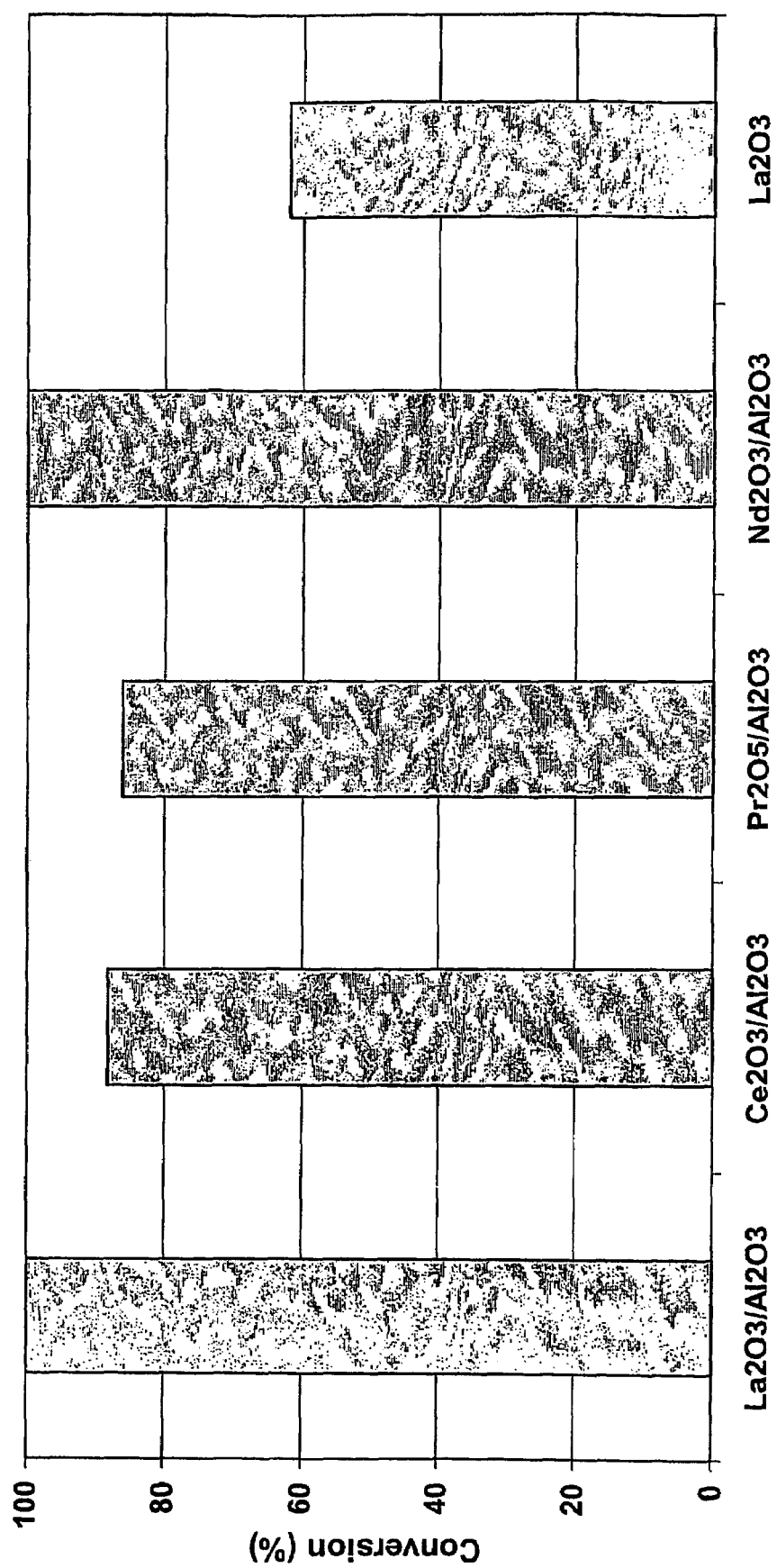
FIG. 2: Conversion of carbon tetrachloride over 10 wt % supported lanthanide oxide catalysts at 350° C.

FIG. 2 compares the conversion of $CCl_4$ over a series of 10 wt % $Ln_2O_3/Al_2O_3$ materials after 6 hours time-on-stream for a $CCl_4$ loading of 47000 ppm (v/v). Two catalysts show 100% conversion, namely $La_2O_3/Al_2O_3$ and $Nd_2O_3/Al_2O_3$, while $Ce_2O_3/Al_2O_3$ and $Pr_2O_3/Al_2O_3$ have a destruction activity of about 85%. Thus, the destruction activity increases in the order: Pr≈Ce<La≈Nd.

EXAMPLE 7

Figure 3:
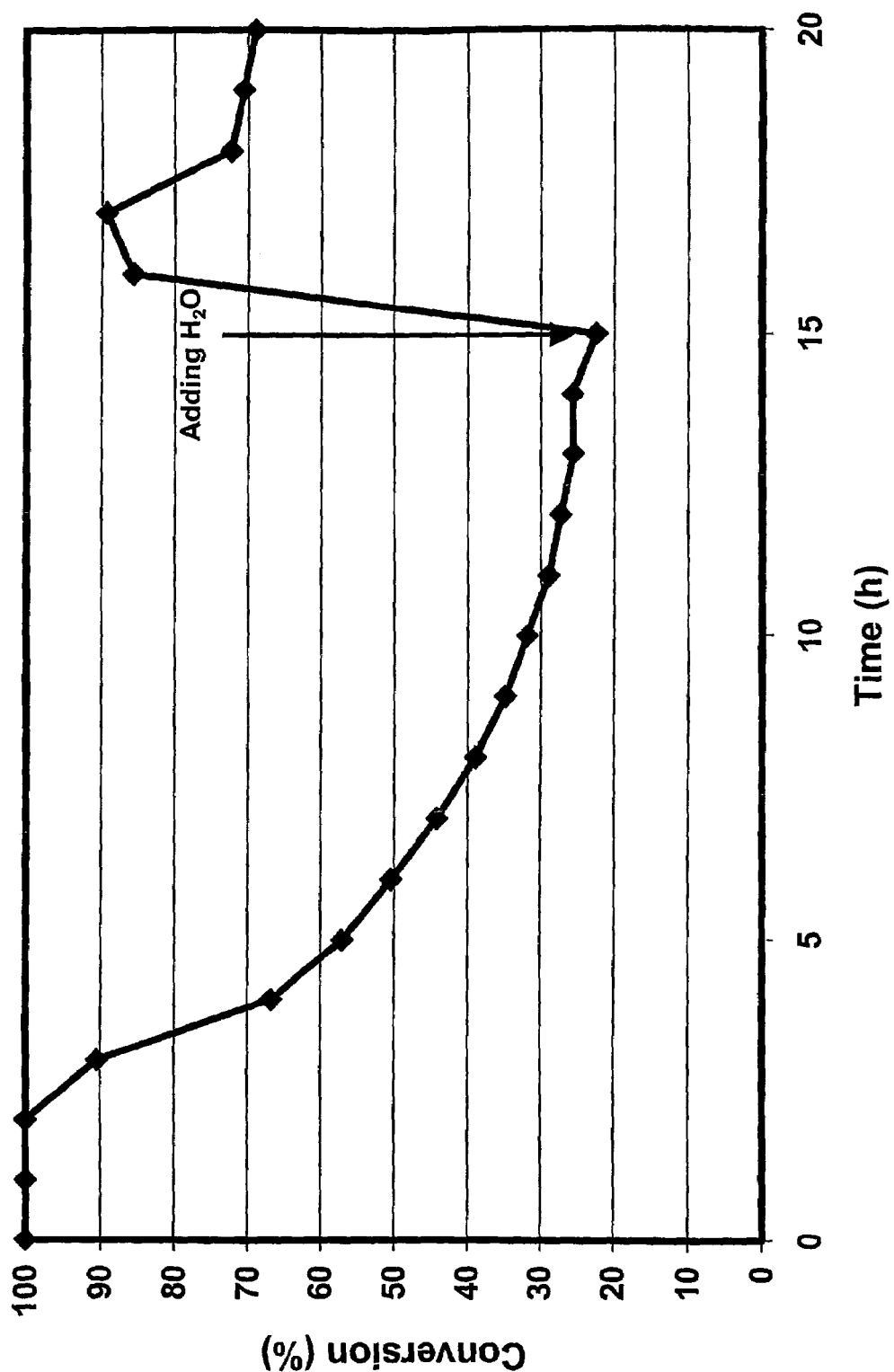
FIG. 3: Influence of the presence of steam on the conversion of $CCl_4$ over a 10 wt % $La_2O_3/Al_2O_3$ catalyst at 350° C.

Influence of Steam on the Catalytic Performance of Lanthanide Oxide-Based Catalysts In another experiment we have studied the Influence of steam on the catalytic performance of a 10 wt % $La_2O_3/Al_2O_3$ catalyst for a $CCl_4$ loading of 40000 ppm (v/v) measured at 350° C. The catalytic results are summarised in FIG. 3. The experiment started with a period in which no steam was added to the reaction system and water was only added to the reaction mixture after about 16 hours time-on-stream. FIG. 3 shows that initially the conversion was 100% but this destruction activity gradually decreases with increasing time-on-stream. After about 14 hours the conversion was only 22%. Addition of steam dramatically increases the conversion up to a value of 90%. This experiment points towards the crucial role of steam for maintaining the catalyst activity.

EXAMPLE 8

Incomplete Destruction $CCl_4$ and the Selective Formation of $CH_3Cl$

Figure 4:
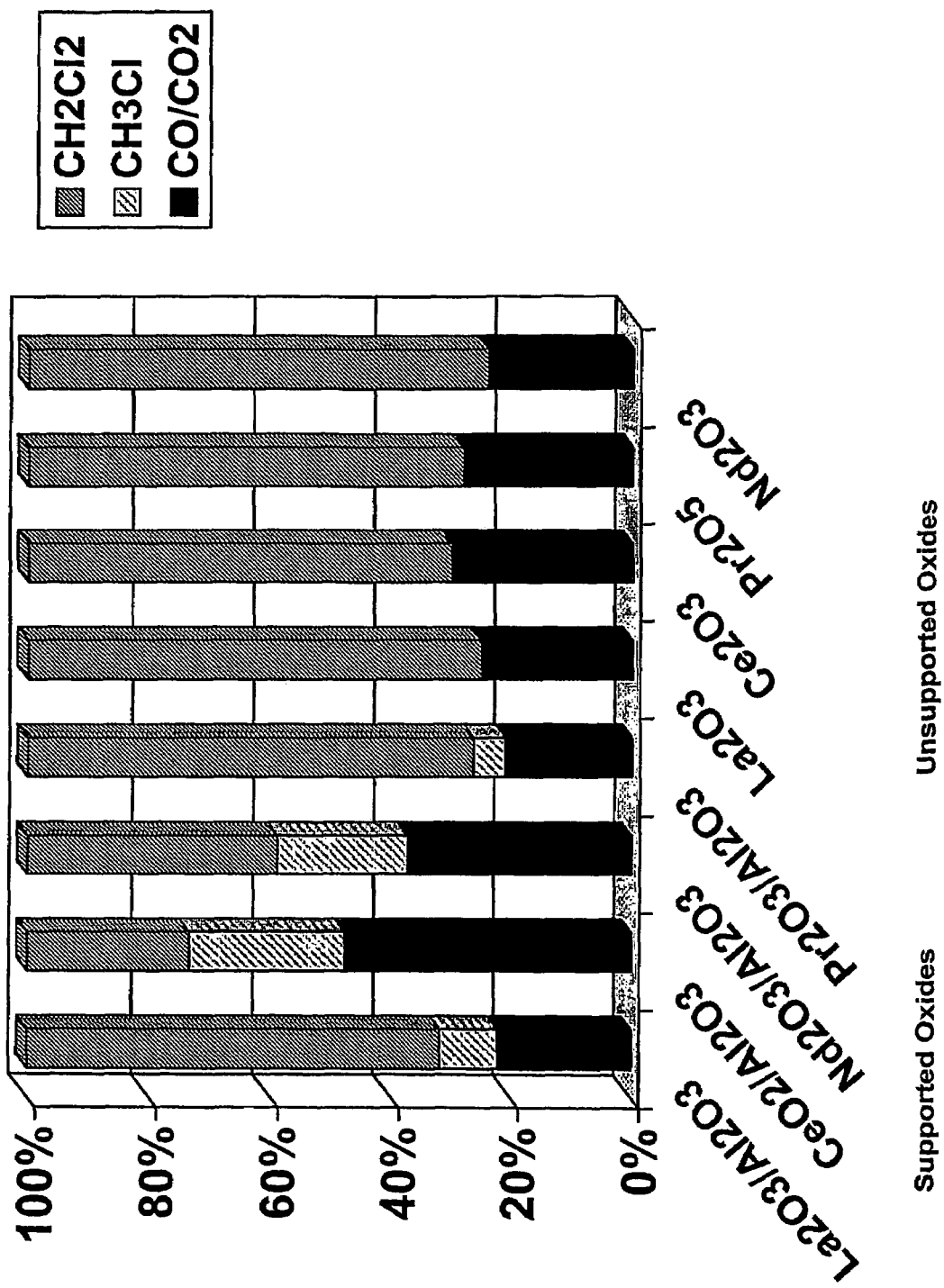
FIG. 4: Comparison of the catalytic destruction activity of supported and unsupported lanthanide oxide catalysts at 350° C.

It was found that the catalytic hydrolysis process over some halogenated hydrocarbons, such as $CH_2Cl_2$, can lead to different reaction products. This is illustrated in FIG. 4. FIG. 4 compares the catalytic destruction activity of supported and unsupported lanthanide oxide catalysts at 350° C. For the unsupported catalysts the only product is $CO_2/CO$ and HCl (complete destruction to the final products). In contrast, the supported catalysts form $CH_3Cl$ and CO besides HCl. This means that it is possible to realise an incomplete destruction process and the selective formation of $CH_3Cl$ by changing the catalyst composition. This opens a new route towards the conversion of chlorinated hydrocarbons towards valuable chemicals, more specifically alkanes and alkenes. Indeed, it is known in open literature that acid zeolites, such as H-ZSM-5 and SAPO-34, are able to convert $CH_3Cl$ into e.g. ethylene.

REFERENCES TO THIS APPLICATION

[1] Hileman, B. Concerns Broaden over chlorine and chlorinated hydrocarbons. *Chemical Engineering News* 1993, 11-20.

[2] Ella, C.; Fries I V, H.; Sen, A. NO-catalyzed deep oxidation of toxic chloroorganics by dioxygen: possible application in environmental remediation. *Catalysis Letters* 2000, 68, 153-156.

[3] Liu, Y.; Luo, M.; Wei, Z.; Xin, Q.; Ying, P.; Li, C. Catalytic oxidation of chlorobenzene on supported manganese oxide catalysts. *Applied Catalysis B: Environmental* 2001, 29, 61-67.

[4] Lester, G. R. Catalytic destruction of hazardous halogenated organic chemicals. *Catalysis Today* 1999, 53, 407-418.

[5] Bonarowska, M.; Malinowski, A.; Juszczyk, W.; Karpinski, Z. Hydrodechlorination of $CCl_2F_2$ (CFC-12) over silica-supported palladium-gold catalysts. *Applied Catalysis B: Environmental* 2001, 30, 187-193.

[6] Bond, G. C.; Sadeghi, N. Catalysed destruction of chlorinated hydrocarbons. *Journal of Applied Chemistry and Biotechnology* 1975, 25, 241-248.

[7] Gonzalez-Velasco, J. R.; Lopez-Fonseca, R.; Aranzabal, A.; Gutierrez-Ortiz, J. I.; Steltenpohl, P. Evaluation of H-type zeolites in the destructive oxidation of chlorinated volatile organic compounds. *Applied Catalysis B: Environmental* 2000, 24, 133-242.

[8] Lou, J. C.; Lee, S. S. Destruction of trichloromethane with catalytic oxidation. *Applied Catalysis B: Environmental* 1997, 12, 111-123.

[9] van den Brink, R. W.; Mulder, P.; Louw, R. Catalytic combustion of chlorobenzene on Pt/γ-$Al_2O_3$ in the presence of aliphatic hydrocarbons. *Catalysis Today* 1999, 54, 101-106.

[10] Corella, J.; Toledo, J. M.; Padilla, A. M. On the selection of the catalyst among the commercial platinum-baed ones for total oxidation of some chlorinated hydrocarbons. *Applied Catalysis B: Environmental* 2000, 27, 243-256.

[11] Krishnamoorthy, S.; Rivas, J. A.; Amiridis, M. D. Catalytic oxidation of 1,2-dichlorobenzene over supported metal oxides. *Journal of Catalysis* 2000, 193, 264-272.

[12] Feijen-Jeurissen, M. M. R.; Jorna, J. J.; Nieuwenhuys, B. E.; Sinquin, G.; Petit, C.; Hindermann, J. P. Mechanism of catalytic destruction of 1,2-dichloroethane and trichloroethylene over γ-$A_2O_3$ and γ-$Al_2O_3$ supported chromium and palladium catalysts. *Catalysis Today* 1999, 54, 65-79.

[13] Kim, C. C.; Ihm, S. K., Role of water In the catalytic decomposition of chlorinated hydrocarbons over chromium-containing catalysts. *Journal of Chemical Engineering of Japan* 2001, 34, 143-147.

[14] Padilla, A. M.; Corella, J.; Toledo, J. M. Total oxidation of some chlorinated hydrocarbons with commercial chromia based catalysts. *Applied Catalysis B: Environmental* 1999, 22, 107-121.

[15] Yim, S. D.; Chang, K. H.; Koh, D. J.; Nam, I—S.; Kim, Y. G. Catalytic removal of perchloroethylene (PCE) over supported chromium oxide catalysts. *Catalysis Today* 2000, 63, 215-222.

[16] Spivey, J. J. Complete catalytic oxidation of volatile organics. *Industrial & Engineering Chemistry Research* 1987, 26, 2165-2180.

[17] Sinquin, G.; Hindemann, J. P.; Petit, C.; Kiennemann, A. Perovskites as polyvalent catalysts for total destruction of $C_1$, $C_2$ and aromatic chlorinated volatile organic compounds. *Catalysis Today* 1999, 54, 107-118.

[18] Sinquin, G.; Petit, C.; Libs, S.; Hindermann, J. P.; Kiennemann, A. Catalytic destruction of chlorinated $C_1$ volatile organic compounds (CVOCs) reactivity, oxidation, and hydrolysis mechanisms. *Applied Catalysis B: Environmental* 2000, 27, 105-115.

[19] Gonzalez-Velasco, J. R.; Aranzabal, A.; Lopez-Fonseca, R.; Ferret, R.; Gonzalez-Marcos, J. A. Enhancement of the catalytic oxidaton of hydrogen-lean chlorinated VOCs in the presence of hydrogen supplying compounds. Applied Catalysis B: Environmental 2000, 24, 33-43.

[20] Poplawski, K.; Lichtenberger, J.; Keil, F. J.; Schnitzlein, K.; Amiridis, M. D. Catalytic oxidation of 1,2-dichlorobenzene over $ABO_3$-type perovskites. *Catalysis Today* 2000, 62, 329-336.

[21] Schneider, R.; Kiessling, D.; Wendt, G. Cordierite monolith supported perovskite-type oxides—catalysts for the total oxidation of chlorinated hydrocarbons. *Applied Catalysis B: Environmental* 2000, 28, 187-195.

[22] Frankel, K. A.; Jang, B. W-L.; Spivey, J. J.; Roberts, G. W. Deactivation of hydrodechlorination catalysts 1. Experiments with 1,1,1-trichloroethane. *Applied Catalysis A: General* 2001, 205, 263-278.

[23] Pistarino, C.; Finocchlo, E.; Romezzano, G.; Brichese, F.; Felice, R. D.; Busca, G. A study of the catalytic dehydrochlorination of 2-chloropropane in oxidizing conditions. *Industrial & Engineering Chemistry Research* 2000, 39, 2752-2760.

[24] Juszczyk, W.; Malinowski, A.; Karpinski, Z. Hydrodechlorination of $CCl_2F_2$ (CFC-12) over γ-alumina supported palladium catalysts. *Applied Catalysis A: General* 1998, 166, 311-319.

[25] Zhang, Z. C.; Beard, B. C. Genesis of durable catalyst for selective hydrodechlorination of $CCl_4$ to $CHCl_3$. *Applied Catalysis A: General* 1998, 174, 33-39.

[26] Shin, E-J.; Kean, M. A. Gas phase catalytic hydrodechlorination of chlorophenols using a supported nickel catalyst. *Applied Catalysis B: Environmental* 1998, 18, 241-250.

[27] Chatterjee, S.; Greene, H. L.; Joon Park, Y. Comparison of Modified Transition Metal-Exchanged Zeolite Catalysts for Oxidation of Chlorinated Hydrocarbons. *Journal of Catalysis* 1992, 138, 179-194.

[28] Petrosius, S. C.; Drago, R. S.; Young, V.; Grunewald, G. C. Low-Temperature Decomposition of Some Halogenated Hydrocarbons Using Metal Oxide/Porous Carbon Catalysts. *Journal of the American Chemical Society* 1993, 115, 6131-6137.

TABLE 1

Overview of catalytic materials existing in the literature for the destruction of $CCl_4$ in the temperature range 0-350° C.

| Catalyst | Loading $CCl_4$ (ppm) | GHSV ($h^{-1}$) | Temperature (° C.) | Destruction capacity ($10^6$ ppm/h) | Reference |
|---|---|---|---|---|---|
| $LaMnO_3$ | 500 | 6000 | 350 | 2.4 | 18 |
| $LaCoO_3$ | 500 | 6000 | 350 | 0.6 | 18 |
| Co-Y | 1 000 | 1367 | 350 | 1.4 | 27 |
| Cr-Y | 1 000 | 1367 | 350 | 1.4 | 27 |
| Carbon | 60 000 | 50 | 250 | 1.4 | 28 |
| $Cr_2O_3/Al_2O_3$ | 1 000 | 15 000 | 350 | 5.3 | 4 |
| Pt, Pd or $Rh/TiO_2$ (Allied-Signal, Morristown, NJ) | 1 000 | 15 000 | 350 | 15 | 4 |
| $La_2O_3/Al_2O_3$ | 47 000 | 800 | 250 | 12.7 | This work |
| $La_2O_3/Al_2O_3$ | 47 000 | 800 | 300 | 22.4 | This work |
| $La_2O_3/Al_2O_3$ | 47 000 | 800 | 350 | 42.3 | This work |

The invention claimed is:

1. A catalytic process for the destruction of halogenated hydrocarbons in a gas stream, comprising the hydrolysis of the halogenated hydrocarbons by flowing said halogenated hydrocarbons over a lanthanide oxide catalyst, or a mixture of lanthanide oxides, wherein said lanthanide oxide catalyst has the general formula of $Ln_2O_3$, in the presence of steam at a temperature higher than 200° C. and lower than or about 350° C.

2. The catalytic process according to claim 1, wherein the temperature varies between about 250° C. and about 350° C.

3. The catalytic process according to claim 1, wherein water is added to said gas stream.

4. The catalytic process of claim 1, wherein said lanthanide oxide catalyst, or mixture of lanthanide oxides, is a solid catalyst supported by a suitable substrate.

5. The catalytic process of claim 1, wherein said lanthanide oxide catalyst, or mixture of lanthanide oxides, is a solid catalyst supported by a suitable substrate and wherein said substrate is selected from the group consisting of alumina, titania, silica, silica-alumina, manganese oxide, zirconia, zeolites and mixtures thereof.

6. The catalytic process of claim 1, wherein said lanthanide oxide catalyst, or mixture of lanthanide oxides, is a solid catalyst supported by a suitable substrate and wherein said substrate is alumina with a surface area from 80 to 300 $m^2/g$.

7. The catalytic process of claim 1, wherein said lanthanide oxide catalyst is selected from the group of compounds consisting of $La_2O_3$, $Nd_2O_3$, $Pr_2O_3$, and $Ce_2O_3$.

8. The catalytic process of claim 1, wherein the destruction of halogenated hydrocarbons is catalysed by an $Al_2O_3$ supported lanthanide oxide catalyst.

9. The catalytic process of claim 1, wherein said process converts chlorinated hydrocarbons in a flue gas into the reaction products $CO_2$ and HCl, further comprising measuring the concentration of chlorinated hydrocarbons in said flue gas from reaction site and accordingly adjusting the gas flow, temperature and steam supply at the reaction site to monitor the catalytic performance.

10. The catalytic process of claim 9, further comprising measuring unwanted reaction products, such as dioxins and/or polychlorobiphenyls, in said flue gases from reaction site and adjusting the reaction temperature to monitor the formation of said unwanted reaction products or the destruction of said chlorinated hydrocarbons.

11. The catalytic process of claim 1, wherein said lanthanide oxide catalyst, or mixture of lanthanide oxides, is a solid catalyst supported by a suitable substrate and wherein said supported lanthanide oxide catalyst is selected from the group consisting of $La_2O_3/Al_2O_3$, $Pr_2O_3/Al_2O_3$, $Nd_2O_3/Al_2O_3$, and $Ce_2O_3/Al_2O_3$.

12. The catalytic process of claim 1, wherein said lanthanide oxide catalyst, or mixture of lanthanide oxides, is a solid catalyst supported by a suitable substrate and wherein said supported lanthanide oxide catalyst is a $La_2O_3/Al_2O_3$ catalyst and the amount of $La_2O_3$ is at least 5 wt % of the total dry weight of the catalyst composition.

* * * * *